(12) United States Patent
Visvanathan et al.

(10) Patent No.: US 6,359,643 B1
(45) Date of Patent: Mar. 19, 2002

(54) METHOD AND APPARATUS FOR SIGNALING A STILL IMAGE CAPTURE DURING VIDEO CAPTURE

(75) Inventors: Sriram Visvanathan, San Jose; Oleg Rashkovskiy, Cupertino; Christoph Scheurich, Santa Cruz, all of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/144,371

(22) Filed: Aug. 31, 1998

(51) Int. Cl.⁷ ............................................... H04N 5/262
(52) U.S. Cl. .................... 348/14.14; 348/220; 348/222; 348/559; 348/552; 348/722
(58) Field of Search ................. 348/552, 559, 348/722, 18, 22, 24, 220, 231, 211, 222, 239, 14.14; 375/240; H04N 5/262

(56) References Cited

U.S. PATENT DOCUMENTS

| | | | | |
|---|---|---|---|---|
| 4,924,303 A | * | 5/1990 | Brandon et al. ............... 358/86 |
| 5,440,343 A | * | 8/1995 | Parulski et al. .............. 348/220 |
| 5,537,528 A | * | 7/1996 | Takahashi et al. ........... 395/154 |
| 5,675,358 A | * | 10/1997 | Bullock et al. .............. 345/115 |
| 5,754,227 A | * | 5/1998 | Fukuoka ...................... 348/232 |
| 5,764,276 A | * | 6/1998 | Martin et al. ................ 348/552 |
| 5,943,093 A | * | 8/1999 | Anderson et al. ........... 348/220 |
| 5,986,698 A | * | 11/1999 | Nobuoka ..................... 348/220 |
| 5,986,701 A | * | 11/1999 | Anderson et al. ........... 348/222 |
| 6,034,733 A | * | 3/2000 | Balram et al. ............... 348/448 |
| 6,037,989 A | * | 3/2000 | Kim ............................ 348/552 |
| 6,038,257 A | * | 3/2000 | Brusewitz et al. ........... 375/240 |
| 6,222,538 B1 | * | 4/2001 | Anderson .................... 345/336 |

\* cited by examiner

*Primary Examiner*—Michael Lee
*Assistant Examiner*—Jean W. Désir
(74) *Attorney, Agent, or Firm*—Blakely, Sokoloff, Taylor & Zafman LLP

(57) ABSTRACT

A method provides for the signaling of a still image capture during video capture, the method including a step of receiving a still image frame capture command in a push model mechanism. The method also includes a step for capturing an image frame; and, modifying a set of bits in an image plane in the image frame; wherein the set of bits in the image plane indicates that the image frame is a still image frame. An apparatus for performing the method is also provided.

23 Claims, 3 Drawing Sheets

METHOD AND APPARATUS FOR SIGNALING A STILL IMAGE CAPTURE DURING VIDEO CAPTURE

BACKGROUND OF THE INVENTION

1. Field of the Invention

This invention is related to the field of use of image capture. More particularly, this invention is directed to a method and apparatus for signaling a still image capture during video capture.

2. Description of Related Art

Video capture using a digital camera attached to the personal computer (PC) has become very prevalent. Video capture may be used for such applications as video conferencing, video editing, and distributed video training. Many components of hardware and software need to work seamlessly to both get the video data (also referred to as a video "stream") from the hardware through the various layers of software on the PC and made visible on a display medium. Apart from displaying motion video, users usually also like the capability to capture a single frame of the video for further processing. This process is also known as capturing a still image from a video stream. The applications that can operate with data from or generate these video streams are commonly referred to as streaming applications.

Currently, the capture of such a still image may be accomplished using a "pull" mechanism, where an application initiates the process of capturing a still image. Typically, the application initiates the process after a user has used a graphical user interface, such as selecting a button or a menu command, or otherwise provided a command to the application indicating that the user wishes to capture a still image from the video stream.

The second mechanism, the "push" mechanism, is where the hardware and lower layers of the software (e.g., a driver for the hardware), provides an indication to an application that the user intends to capture a still image. In this mechanism, a user would operate a switch on the digital camera that generates a signal to indicate an image capture is desired.

One way a still image could be captured from a video stream using the push method is by using a buffering mechanism. The buffering mechanism caches the data for the still image in the device driver and waits for an application to poll the driver periodically for the availability of such a still image. However, the implementation of this mechanism would involve the writing of a separate application that is capable of communicating with the device driver. In addition, a complex signaling system might be required for communicating information between the driver and the application once the still image is received by the hardware. Hence, in this implementation, the still image application becomes very customized to the driver, and is not easily portable to other devices that may require different drivers.

Thus, it is desirable to have a mechanism that assists common streaming applications to also act as a still image aware application.

SUMMARY

A method comprising receiving a still image frame capture command in a push model mechanism; capturing an image frame; and, modifying a set of bits in an image plane in said image frame; wherein said set of bits in said image plane indicates that said image frame is a still image frame. An apparatus for performing the above method is also provided.

DETAILED DESCRIPTION

Figure 1:
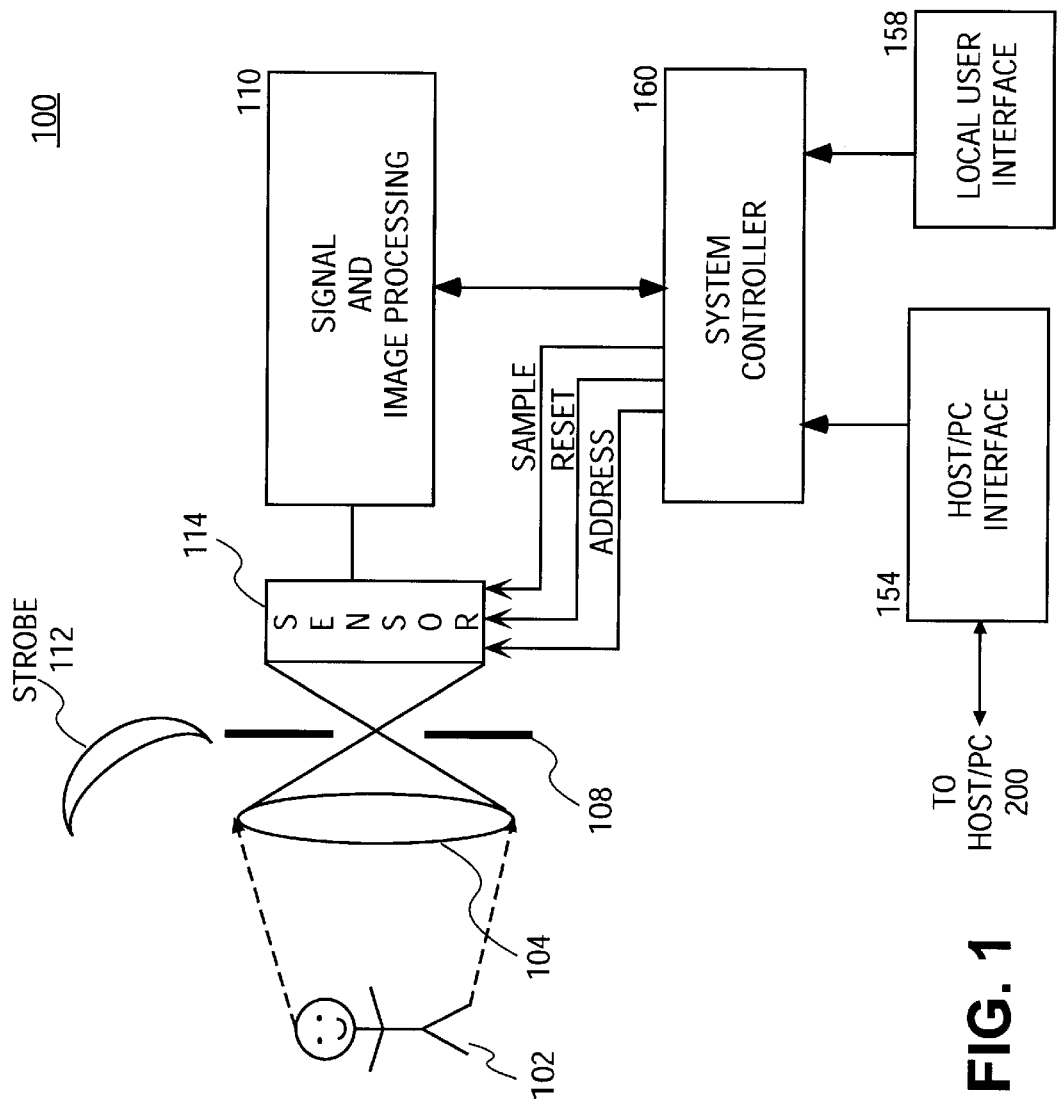
FIG. 1 is a block diagram of an imaging system configured in accordance with one embodiment of the present invention.

The present invention is a method and apparatus for signaling a still image capture during video capture. For purposes of explanation, specific embodiments are set forth to provide a thorough understanding of the present invention. However, it will be understood by one skilled in the art, from reading this disclosure, that the invention may be practiced without these details. Further, although the present invention is described through the use of a CMOS image system, most, if not all, aspects of the invention apply to image systems in general. Moreover, well-known elements, devices, process steps and the like are not set forth in detail in order to avoid obscuring the present invention.

The present invention provides a system for a user to extract a still image from a continuous stream of video in a push model mechanism. In one embodiment, the camera that is used may communicate with other devices using a bus such as the Universal Serial Bus (USB), as specified in the Universal Serial Bus Specification, Revision 1.0 (Jan. 15, 1996). The camera connects to a USB port available in most personal computers.

The camera uses the USB protocol to send the packets containing data of a video frame across the USB to be re-assembled at a host, which may be a personal computer (PC). These packets are re-assembled at the host PC in order to reconstruct the frame of video data. In order to properly view motion video, the camera hardware and the host software have a handshake mechanism to signal the start and end of a particular video frame. Once the host software locks into a start of video frame (SOVF) header, it continues to gather data until an end of video frame (EOVF) header is reached. A sequence of such SOVF headers and EOVF headers defining a series of frames constitute motion video.

In one embodiment, the digital camera generates video data in the YCrCb digital color system defined by the International Consultative Committee on Broadcasting (CCIR) and referred to as the CCIR 601 color space. YCrCb defines color images in terms of luminance (Y component) and two different chrominance values. One representation is the YUV-12 planar format, where the actual data of a frame is arranged in three planes: a Y-plane (luma), a U-plane (chroma), and a V-plane (chroma). Each pixel is represented by 12-bits on the average.

In one embodiment, the digital camera provides a switch that may be activated by the user to signal the system that a still image capture is desired. When the switch is activated while the camera is in the digital video mode, the SOVF header that belongs to the frame that: (1) is in the process of being captured; (2) has just been captured; or (3) is to be captured, is. The modified SOVF header signals the driver software located on the host PC that the switch to capture a still image has been activated by the user. In one embodiment, the SOVF header contains a field that is one bit in length that is set to indicate that the current frame is a still image.

The present invention provides a system of transferring the identification of the frame that is to be used as the still image, along with the frame, from the driver software to an interested application executing on the host/PC. In one embodiment, once the notification of the capture of the frame is received by the driver software, the driver software sets the least significant bit (LSB) of the last byte of the Y plane to a '1'. For each video frame where the header information does not indicate that the switch to mark the frame as containing the desired still image has been activated, the LSB is set to a '0'. The effect of modifying this bit of information for a frame actual video displayed is not appreciably distinguishable under most conditions.

When the application starts and properly recognizes that it is communicating to the above driver software, then it can start monitoring the LSB of the Y plane of every frame that comes across to it. As soon as the application sees a '1' in the LSB, it can cache that frame of data in its local buffers and pass it along to other software modules that can do further image processing on this still image frame. The implementation of this mechanism is very trivial and can be performed by any application that also has the capability to stream video data. It does not require complex functionality on the application to otherwise sense a push model still image nor does it need complex hardware implementation (by way of interrupt pipes on USB) to signal a still image when the button is pressed. The application may perform captures even while it is displaying motion video containing the source of video from where the frame is to be identified in a window.

An embodiment of the invention as an imaging system 100 is shown as a logical block diagram in FIG. 1. Imaging system 100 includes a number of conventional elements, such as an optical system having a lens 104 and aperture 108 that is exposed to the incident light reflected from a scene or object 102. The optical system properly channels the incident light towards a sensor array 114 that generates sensor signals in response to an image of object 102 being formed on sensor array 114. The various control signals used in the operation of sensor array 114, such as the RESET signal, the SAMPLE signal, and the ADDRESS signal, is generated by a system controller 160. System controller 160 may include a microcontroller or a processor with input/output (I/O) interfaces that generates the control signals in response to instructions stored in a non-volatile programmable memory. Alternatively, a logic circuit that is tailored to generate the control signals with proper timing can be used. System controller 160 also acts in response to user input via a local user interface 158 (as when a user pushes a button or turns a knob of system 100) or a host/PC interface 154 to manage the operation of imaging system 100.

To obtain images, a signal and image processing block 110 is provided in which hardware and software operate according to image processing methodologies to generate captured image data in response to receiving the sensor signals. Optional storage devices (not shown) can be used aboard system 100 for storing the captured image data. Such local storage devices may include a removable memory card. Host/PC interface 154 is included for transferring the captured image data to an image processing and/or viewing system such as a computer separate from imaging system 100, as described below. Imaging system 100 can optionally contain a display means (not shown) for displaying the captured image data. For instance, imaging system 100 may be a portable digital camera having a liquid crystal display or other suitable low power display for showing the captured image data.

Figure 2:
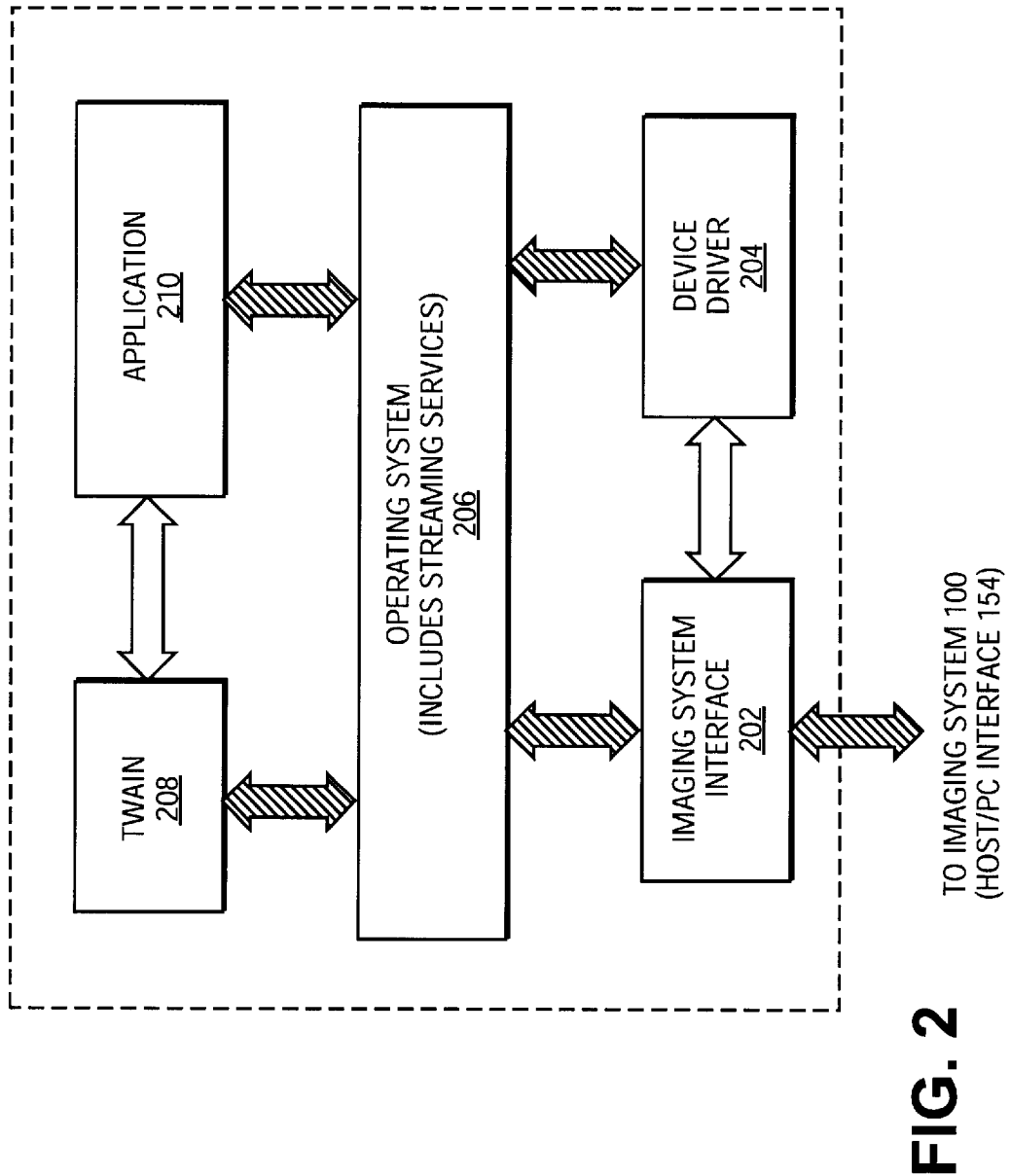
FIG. 2 is a block diagram of a host/personal computer (PC) configured in accordance with one embodiment of the present invention.

FIG. 2 is a logical block diagram illustrating a host/PC 200 with an imaging system interface 202, a device driver 204, an operating system 206, a TWAIN module 208, and an application 210.

Imaging system interface 202 couples host/PC 200 with imaging system 100 through the use of host/PC interface 154. In one embodiment, as described for host/PC interface 154, imaging system interface 202 is a USB interface. In other embodiments, host/PC interface 154 may be a parallel interface or a Small Computer System Interface (SCSI) in accordance with American National Standards Institute (ANSI) standard X3.131 (1986). Technologies such as infrared transmission or other wireless transmission met hods may also be used for host/PC interface 154.

Device driver 204 is an interface to imaging system 100 that allows operating system 206 to control and communicate with imaging system 100 through host/PC interface 154. In one embodiment, device driver 204 is responsible for accessing the hardware registers of the imaging system 100 and often includes an interrupt handler to service interrupts generated by imaging system 100. Device driver 204 may be installed from files after operating system 206 is running.

TWAIN module 208 represents the standard software protocol and applications programming interface (API) that regulates communication between software applications such as application 210 and imaging devices such as imaging system 100. The TWAIN specification is promoted by the TWAIN working group, which is composed of a group of companies involved in the imaging industries. The current specification for TWAIN may be found on-line on the Internet at (http://www.twain.org/). Thus, in one embodiment, TWAIN module 208 works with device driver 204, operating system 206 and application 210 as an abstraction of imaging system 100. This allows application 210 to be "device independent", which means that application 210 does not have to be reconfigured to interface with each imaging device. When a new device is to be interfaced with application 210, only a new device driver has to be created.

Application 210 is a software application which is executing on operating system 206. In one embodiment, application 210 is a TWAIN compatible application that conforms to the TWAIN specification, as described above. Application 210 may provide a graphical user interface for displaying streaming video from an imaging device such as imaging system 100. In addition, for capturing still images using a prior art "pull" method, application 210 may provide a button to initiate an still image capture. For obtaining a still image capture in accordance with one embodiment of the present invention, application 210 interfaces with TWAIN module 208 to receive notification of a still image capture signaled by the user from the streaming video.

Figure 3:
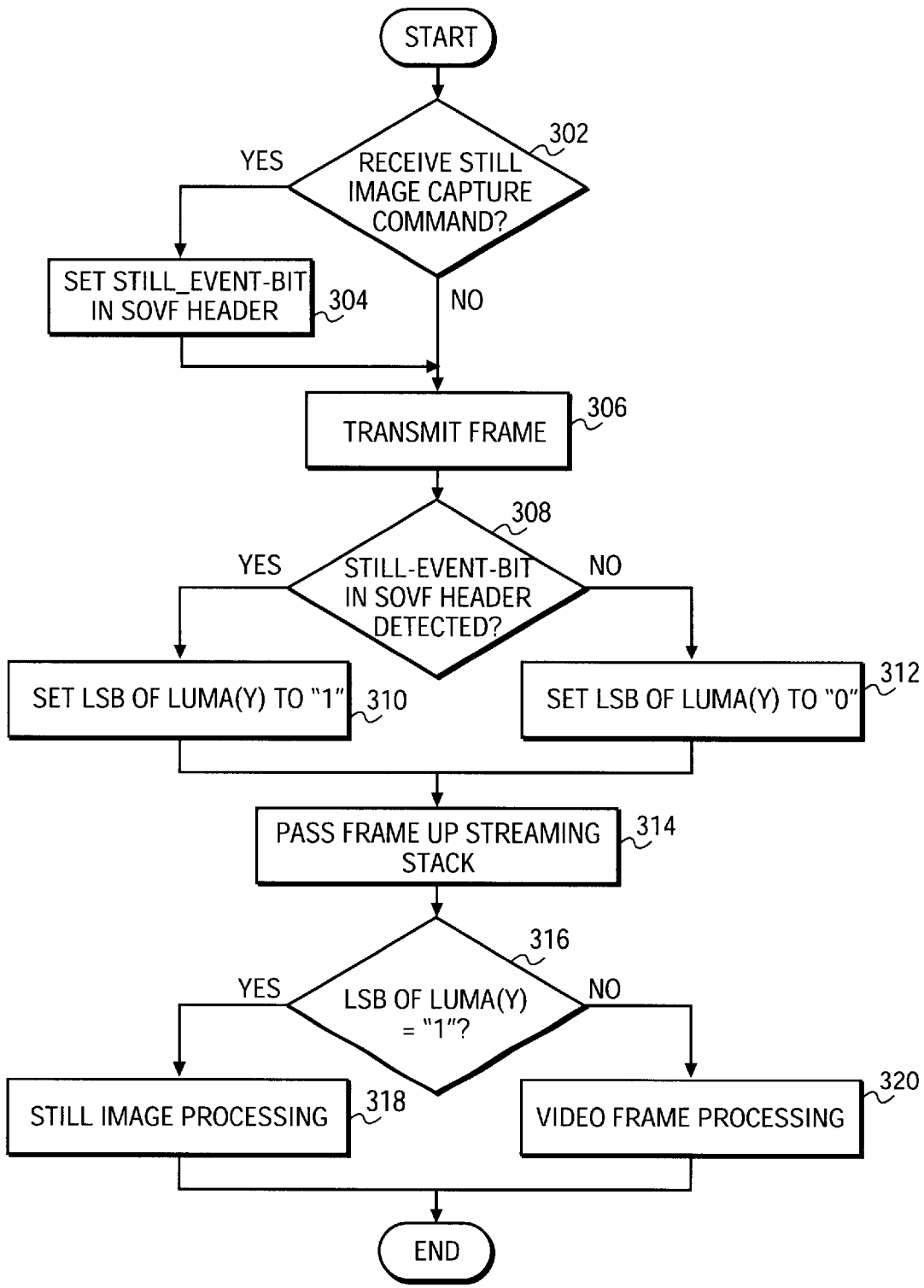
FIG. 3 is a flow diagram of the operation of the imaging system and host/PC in accordance with one embodiment of the present invention.

FIG. 3 is a flow diagram illustrating one mode of operation of the present invention provide the signaling of still image capture during video capture.

In block 302, imaging system 100 detects whether a still image capture command has been received from a user through local user interface 158. As stated above, the still image capture command may be generated by the user using an interface such as a mechanical switch that is part of local user interface 158. If a still image capture command is received, then operation continues with block 304. Otherwise, operation continues with block 306.

In block 304, imaging system 100 has detected a still image capture command from the user. Once imaging system 100 has detected the still image capture command, signal and image processing unit 110 sets a STILL_

EVENT-BIT in the start of video frame (SOVF) header. As discussed above, in one embodiment, the STILL_EVENT-BIT in the SOVF header of the frame that has just been captured is set. In other embodiments, signal and image processing unit 110 may set the STILL_EVENT-BIT in the SOVF header of a frame that is to captured a predetermined time after the still image captured command is detected. This predetermined time may be set by the user or preset during manufacturing. Operation then continues with block 306.

In block 306, the frame that has just been capture is transmitted from imaging system 100 to host/PC 200 through the use of host/PC interface 154 and imaging system interface 202. In one embodiment, the frame is transmitted using the USB protocol. Device driver 204 receives and processes the data for the frame. Operation continues with block 308.

In block 308, device driver 204 determines whether the STILL_EVENT-BIT in the SOVF header that has been received has been set. Pseudo-code describing the operation of device driver 204 is further described below. If STILL_EVENT-BIT is set, then operation continues with block 310. Otherwise, operation continues with block 312.

In block 310, device driver 204 has detected that STILL_EVENT-BIT is set and sets the least significant bit of the Luma (Y) plane of the received frame to "1". This indicates that the received frame is indicated by the user as a still image. In other embodiments, more bits of the Luma (Y) plane may be set to indicate other information, such as time coding or security information. Operation then continues with block 314.

In block 312, device driver 204 has detected that STILL_EVENT-BIT has not been set. Thus, device driver 204 sets the least significant bit of the Luma (Y) plane of the received frame to "0". Operation then continues with block 314.

In block 314, the frame is passed up through the streaming stack of operating system 206. In one embodiment, operating system 206 includes a streaming service such as Video for Windows, which is a standard message based protocol for the capture and display of video on a computer such as host/PC 200 provided by Microsoft Corporation. The streaming service is responsible for receiving frame data from device driver 204 and delivering it to TWAIN module 208. It is to be noted that frame data may be constantly streaming from imaging system 100 to host/PC 200 and the data that makes up each frame may be spread out over the various components of imaging system 100 and host/PC 200 at any time.

TWAIN module 208 informs application 210 that a user indicated still frame has been received once TWAIN module 208 has received data for the still frame. In one embodiment, TWAIN module 208 informs application 210 through a callback function, which application 210 registers with TWAIN module 208, that a still image is pending in TWAIN module 208. If application 210 is to retrieving this still image, then application 210 starts providing TWAIN module 208 with buffers that TWAIN module 208 fills with the data of the still image before returning them to application 210.

In block 316, application 210 determines whether the LSB of the Luma (Y) plane of the frame being processed has been set to "1". If so, then operation proceeds with block 318. Otherwise, operation continues with block 320.

In block 318, application 210 has detected the LSB of the Luma (Y) plane of the frame being processed has been set to "1", indicating that the frame being processed is to be processed as a still image. Application 210 may then treat the frame being processed as a still image. For example, if application 210 provides a window for displaying streaming video, application 210 may open a new window to display a still image. Also, if imaging system 100 treats a frame in a special manner if the frame is captured as a still image (e.g., less compression, higher resolution, additional information), then application 210 may process the frame differently.

In block 320, application 210 has detected that the LSB of the Luma (Y) plane of the frame being processed has NOT been set to "1", but has been set to "0". Thus, application 210 may treat the frame being processed as being a video frame. For example, if application 210 has a window for the display of video frames, then the frame is displayed in the window.

The following pseudo-code illustrates the event signaling process in device driver 204:

```
While (streaming) {
    Still_Flag_Signal = FALSE;
    New_Frame = FALSE;
    If(SOVF header) {
        Is Still_Event-Bit set in the header?;
        If set, Still_Flag_Signal = TRUE;
        New_Frame = TRUE;
    }
    if(EOVF header) {
        if(Still_Flag_Signal = = TRUE)
            Set LSB of Luma(Y) to '1';
        Else
            Set LSB of Luma(Y) to '0';
    If(New_Frame = = TRUE) Send_Frame_up_the_Stack;
    New_Frame = FALSE;
    }
}
```

Any video product that needs to perform still event signaling may potentially use this mechanism. In one embodiment, a requirement is for video streaming to be active for this type of still event signaling.

While the present invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention.

What is claimed is:

1. A method comprising:
   receiving a still image frame capture command in a push model mechanism;
   capturing an image frame; and,
   modifying a set of bits in an image plane in said image frame;
   wherein said set of bits in said image plane indicates that said image frame is a still image frame.

2. The method of claim 1, further comprising generating a start of video frame and end of video frame for said image frame.

3. The method of claim 2, further comprising modifying said start of video frame to include a still frame indicator.

4. The method of claim 3, further comprising creating a set of packets containing data from said image frame.

5. The method of claim 4, further comprising transmitting said set of packets.

6. The method of claim 5, further comprising reassembling said set of packets.

7. The method of claim 6, further comprising decoding said start of video frame to retrieve said still image indicator.

8. The method of claim 1, wherein said image plane is a luma plane.

9. The method of claim 1, wherein said set of bits in said image plane includes a least significant bit.

10. An article comprising:
a computer readable medium having instructions stored thereon, which, when executed by a processor, performs:
receiving a still image frame capture command in a push model mechanism;
capturing an image frame; and,
modifying a set of bits in an image plane in said image frame;
wherein said set of bits in said image plane indicates that said image frame is a still image frame.

11. The article of claim 10, wherein said computer readable medium further having instructions stored thereon, which, when executed by said processor, performs generating a start of video frame and end of video frame for said image frame.

12. The article of claim 11, wherein said computer readable medium further having instructions stored thereon, which, when executed by said processor, performs modifying said start of video frame to include a still frame indicator.

13. The article of claim 12, wherein said computer readable medium further having instructions stored thereon, which, when executed by said processor, performs creating a set of packets containing data from said image frame.

14. The article of claim 13, wherein said computer readable medium further having instructions stored thereon, which, when executed by said processor, performs transmitting said set of packets.

15. The article of claim 14, wherein said computer readable medium further having instructions stored thereon, which, when executed by said processor, performs reassembling said set of packets.

16. The article of claim 15, wherein said computer readable medium further having instructions stored thereon, which, when executed by said processor, performs decoding said start of video frame to retrieve said still image indicator.

17. The article of claim 10, wherein said image plane is a luma plane.

18. The article of claim 10, wherein said set of bits in said image plane includes a least significant bit.

19. An imaging system comprising:
a push model mechanism still image capture command detector; and
an image data modification unit coupled to said still image capture command detector for modifying a set of bits in an image plane in an image frame to store a still image capture command wherein said set of bits in said image plane indicates that said image frame is a still image frame.

20. The imaging system of claim 19 where in the system is part of a portable digital camera with a liquid crystal display.

21. The imaging system of claim 19 further comprising a memory card as an optional storage unit for the captured image data.

22. The imaging system of claim 19 further comprising a host personal computer interface for transferring the captured image data to a separate image processing system.

23. The imaging system of claim 19 further comprising an infrared or wireless transmission capability for transferring the captured image data to a separate image processing system.

* * * * *